(12) United States Patent
Ichikawa

(10) Patent No.: US 9,341,477 B2
(45) Date of Patent: May 17, 2016

(54) VIBRATOR ELEMENT, METHOD OF MANUFACTURING VIBRATOR ELEMENT, ANGULAR VELOCITY SENSOR, ELECTRONIC DEVICE, AND MOVING BODY

(71) Applicant: Seiko Epson Corporation, Tokyo (JP)

(72) Inventor: Fumio Ichikawa, Suwa (JP)

(73) Assignee: Seiko Epson Corporation (JP)

( * ) Notice: Subject to any disclaimer, the term of this patent is extended or adjusted under 35 U.S.C. 154(b) by 338 days.

(21) Appl. No.: 13/899,914

(22) Filed: May 22, 2013

(65) Prior Publication Data

US 2013/0312519 A1    Nov. 28, 2013

(30) Foreign Application Priority Data

May 23, 2012 (JP) ................................. 2012-117255

(51) Int. Cl.
   *G01C 19/56* (2012.01)
   *G01C 25/00* (2006.01)
   *G01C 19/5607* (2012.01)

(52) U.S. Cl.
   CPC ............ *G01C 19/56* (2013.01); *G01C 19/5607* (2013.01); *G01C 25/00* (2013.01); *Y10T 29/42* (2015.01)

(58) Field of Classification Search
   CPC ............... G01C 19/5607; G01C 19/56; G01C 19/5642; G01C 19/5649; G01C 19/5726; G01C 19/5776; G01C 19/5628; G01C 19/5621; G01C 19/574
   USPC .............. 73/504.12, 504.16, 504.04; 310/370
   See application file for complete search history.

(56) References Cited

U.S. PATENT DOCUMENTS

| 4,930,351 | A | * | 6/1990 | Macy | G01C 19/5607 73/504.04 |
|---|---|---|---|---|---|
| 5,343,749 | A | | 9/1994 | Macy | |
| 5,408,876 | A | | 4/1995 | Macy | |
| 5,522,249 | A | | 6/1996 | Macy | |
| 5,585,562 | A | * | 12/1996 | Kurata | G01C 19/5607 73/504.16 |
| 5,635,642 | A | * | 6/1997 | Nonomura | G02C 19/5607 73/504.16 |
| 5,866,816 | A | * | 2/1999 | Hulsing, II | G01C 19/5607 73/504.16 |
| 7,002,284 | B2 | * | 2/2006 | Ouchi | G01C 19/5607 310/364 |

(Continued)

FOREIGN PATENT DOCUMENTS

| JP | 05256723 A | 10/1993 |
|---|---|---|
| JP | 08-327366 | 12/1996 |

(Continued)

*Primary Examiner* — Helen Kwok
(74) *Attorney, Agent, or Firm* — Harness, Dickey & Pierce, P.L.C.

(57) ABSTRACT

A vibrator element including: a base portion; vibrating arms which extend from the base portion; a first drive section and a second drive section, and a first detecting section and a second detecting sensor which are respectively provided in the vibrating arms; adjusting arms which extend from the base portion in parallel to the vibrating arms; and a first adjusting section and a second adjusting section which are respectively provided on a principal surface of the adjusting arms, wherein, in the first adjusting section and the second adjusting section, a first electrode, piezoelectric layers, and adjustment electrodes are laminated on the first principal surface to be formed, and output signals of the first adjusting section and the second adjusting section are in antiphase to charges generated by the first detecting section and the second detecting section when no angular velocity is added to the vibrating arms.

10 Claims, 12 Drawing Sheets

(56) References Cited

U.S. PATENT DOCUMENTS

| | | | | |
|---|---|---|---|---|
| 7,207,221 | B2* | 4/2007 | Kawauchi | G01C 19/5607 73/504.12 |
| 8,701,487 | B2* | 4/2014 | Naruse | G01C 19/5726 73/497 |
| 8,803,407 | B2* | 8/2014 | Kawase | H03H 9/0519 310/344 |
| 9,030,082 | B2* | 5/2015 | Ogura | G01C 19/5607 310/344 |
| 2008/0022769 | A1* | 1/2008 | Yamamoto | G01C 19/5607 73/504.16 |
| 2009/0044624 | A1* | 2/2009 | Hayashi | G01C 19/5607 73/504.16 |
| 2011/0140575 | A1 | 6/2011 | Nishizawa | |
| 2012/0126664 | A1 | 5/2012 | Ogura et al. | |
| 2012/0326571 | A1* | 12/2012 | Shimura | H03H 3/02 310/370 |
| 2013/0074597 | A1* | 3/2013 | Ichikawa | G01C 19/5628 73/504.15 |
| 2013/0081473 | A1* | 4/2013 | Ichikawa | G01C 19/5621 73/658 |
| 2013/0081474 | A1* | 4/2013 | Ichikawa | G01C 19/5621 73/658 |
| 2013/0125650 | A1* | 5/2013 | Kawashima | H03B 5/36 73/504.16 |
| 2013/0205898 | A1* | 8/2013 | Nakagawa | G01C 19/5621 73/504.16 |
| 2013/0283910 | A1* | 10/2013 | Nishizawa | H01L 41/0475 73/504.12 |
| 2015/0040664 | A1* | 2/2015 | Ishii | G01C 19/5607 73/504.16 |

FOREIGN PATENT DOCUMENTS

| | | | |
|---|---|---|---|
| JP | 10-078326 | | 3/1998 |
| JP | 2006-054602 | A | 2/2006 |
| JP | 2008-014887 | A | 1/2008 |
| JP | 2008-096138 | * | 4/2008 |
| JP | 2008209215 | A | 9/2008 |
| JP | 2010-043870 | A | 2/2010 |
| JP | 2011-141266 | A | 7/2011 |
| JP | 4830681 | B2 | 12/2011 |
| JP | 2012112748 | A | 6/2012 |

* cited by examiner

VIBRATOR ELEMENT, METHOD OF MANUFACTURING VIBRATOR ELEMENT, ANGULAR VELOCITY SENSOR, ELECTRONIC DEVICE, AND MOVING BODY

BACKGROUND

1. Technical Field

The present invention relates to a vibrator element, a method of manufacturing a vibrator element, an angular velocity sensor, an electronic device, and a moving body.

2. Related Art

An angular velocity sensor which detects physical amounts such as angular velocity, acceleration, and the like is used for vehicle body control in a vehicle, own vehicle position detection of a car navigation system, vibration control correction (so-called camera shake correction) of a digital camera, a video camera, or the like. For example, an angular velocity sensor described in JP-A-2008-14887 has a tuning fork type vibrator element constituted by two vibrating arms and a base portion that connects the same side ends of the two vibrating arms. The vibrator element is configured of a non-piezoelectric material, and each of the vibrating arms is provided with a drive section and a detecting section each of which has a piezoelectric layer interposed between a pair of electrodes.

A tuning fork having two vibrating arms as described above is generally formed by subjecting a substrate to etching processing. Here, it is difficult to process the tuning fork with dimensions as designed due to etching anisotropy of the substrate, variations in the processing process, and the like. Therefore, the tuning fork has an unintended shape, and there may be cases where the vibrating arm is bent in a different direction from its drive direction even in a state where angular velocity is not applied to the vibrating arm. When charges generated by a detecting section due to the bending of the vibrating arm are detected, detection accuracy is degraded.

Here, in the angular velocity sensor described in JP-A-2008-14887, one of a pair of electrodes of the detecting section is partially removed to adjust the amount of charges output from the pair of electrodes of the detecting section in a state where angular velocity is not applied to the vibrating arm.

However, in the angular velocity sensor described in JP-A-2008-14887, a charge amount adjusting section of the vibrating arm also functions as a detection electrode, and thus sensitivity may be degraded.

In addition, since the charge amount adjusting section is provided in the vibrating arm, there are problems in that the amplitude is too high to adjust the charge amount with high accuracy.

SUMMARY

An advantage of some aspects of the invention is to solve at least a part of the problems described above, and the invention can be implemented as the following forms or application examples.

Application Example 1

This application example is directed to a vibrator element including: a base portion; a vibrating arm which extends from the base portion; a drive section and a detecting section provided in the vibrating arm; an adjusting arm which extends from the base portion in parallel to the vibrating arm; and an adjusting section which is provided on a principal surface of the adjusting arm, wherein the adjusting section has a first electrode, a second electrode, and a piezoelectric layer provided between the first and second electrodes, and an output signal of the adjusting arm is in antiphase to a charge output from the detecting section when no physical amount is added to the vibrating arm.

According to this application example, regarding a leakage output of the detecting section caused by variations (particularly, the cross-sections are asymmetric) in the shapes of the vibrating arm, the charge in antiphase to a leakage signal is generated by the adjusting section to cancel out the leakage output. In addition, when a zero-point output (an output current from the adjusting arm in a state where no physical amount such as an angular velocity is added to the vibrator element) is adjusted to a target value or less (for example, "0") by removing (or adding) a part of the adjustment piezoelectric layer of the adjusting section, and the amplitude of the leakage signal (leakage current) is adjusted to a target value or less by removing a part of the second electrode, vibration leakage can be suppressed.

In addition, prunable masses of adjustment piezoelectric layers of first and second adjusting sections are greater than those of adjustment electrodes, which is effective in adjusting the frequency of the adjusting arm. In addition, the second electrode on the piezoelectric layer is effective in adjusting charge amounts. Accordingly, coarse adjustment and fine adjustment are possible, and a range in which vibration leakage is suppressed is enlarged. Therefore, there is an effect of precise suppression.

Application Example 2

In the vibrator element according to the application example, it is preferable that at a tip end portion of the detecting section on an opposite side to the base portion, a wide portion having a greater area than other parts of the detecting section be provided closer to a tip end side than the drive section.

Detection sensitivity is determined by the product to the magnitude of the vibration amplitude excited by the drive section and a charge generation efficiency of the detecting section. Here, by providing the wide detecting section closer to the tip end side than the drive section, detection sensitivity can be increased. In addition, since a change in the charge amount by the adjustment of the tip end portion of the vibrating arm is small, when it is thought that the wide portion is an added mass portion, the wide portion may be used as an adjusting section of the detection frequency.

Application Example 3

In the vibrator element according to the application example, it is preferable that a length of the adjusting arm be shorter than a length of the vibrating arm.

In this configuration, vibration of the adjusting arm for adjusting the leakage output does not impede main vibration of the vibrating arm (that functions as both a drive vibrating arm and a detection vibrating arm). Therefore, vibration characteristics of the vibrator element are stabilized, and there is an advantage of a reduction in the size of the vibrator element.

Application Example 4

In the vibrator element according to the application example, it is preferable that the adjusting section branch off in a width direction of the adjusting arm at a position close to the base portion and extend in a lengthwise direction thereof.

The vibration direction of the adjusting arm is in-plane flexural vibration with respect to the principal surface. For example, a + charge is generated by the electrode of a piezoelectric layer compressed by flexural vibration, and a − charge is generated in a case of elongation. Therefore, since the adjusting section branches off, one of the branching portions generates a + charge, and the other thereof generates a − charge. Therefore, the sum of the amounts of generated charges may be output as an adjustment amount of the leakage signal.

Application Example 5

In the vibrator element according to the application examples, it is preferable that the adjusting section have a common portion which is provided along an extension direction of the adjusting arm, and a plurality of branching portions which branch off from the common portion toward both sides in the width direction and are arranged in the extension direction.

In this configuration, since the plurality of branching portions branch off from the common portion, even though arbitrary branching portions are cut, the other branching portions maintain a state of being electrically connected to the common portion. That is, by reducing the area of the piezoelectric layer or the second electrode of the adjusting section as much as the arbitrary branching portions among the plurality of branching portions, the amount of generated charge may be reduced. Moreover, since the plurality of branching portions are lined up along the extension direction of the adjusting arm, the signal output of the adjusting section may be adjusted simply and with high accuracy according to the positions and the number of branching portions being cut.

Application Example 6

In the vibrator element according to the application example, it is preferable that a tip end side of the plurality of branching portions in the width direction have a greater width than a common portion side.

Accordingly, the adjustment width of the signal output of the adjusting section can be increased by cutting part of the way of the common portion or the branching portions, and the part of the way of the branching portions with narrow tip end sides can be relatively simply cut.

Application Example 7

In the vibrator element according to the application example, it is preferable that in the adjusting arm, a tip end portion be provided with a weight portion, and the adjusting section be provided on a base portion side.

As such, by providing the weight portion on the tip end portion of the adjusting arm, an effect of suppressing leakage vibration can be enhanced while suppressing an increase in the length of the adjusting arm.

Application Example 8

This application example is directed to a method of manufacturing a vibrator element including: forming a base portion, a vibrating arm which extends from the base portion, an adjusting arm which extends from the base portion in parallel to the vibrating arm, and an adjusting section which has a first electrode, a second electrode, and a piezoelectric layer between the first and second electrodes on a principal surface of the adjusting arm, the first electrode being provided on a principal surface side of the adjusting arm; detecting a leakage signal of the adjusting arm; removing or adding a part of the piezoelectric layer when an amplitude of the leakage signal is not in a range of a target value or is not in a range of a set adjustable value, thereby adjusting a frequency of the adjusting arm; and removing or adding a part of the second electrode when the amplitude of the leakage signal is in the range of the adjustable value or is not in the range of the target value, thereby adjusting a charge generated by the adjusting section.

According to this application example, by removing a part of the piezoelectric layer of the adjusting section, the frequency of the adjusting arm is caused to approach the frequency of the vibrating arm (that is, by increasing the amplitude of the adjusting arm, the total amount of charge that can be output from the adjusting section is increased). In addition, by removing or adding a part of the second electrode, the charge amount is adjusted, thereby efficiently suppressing vibration leakage.

Application Example 9

In the method of manufacturing a vibrator element according to the application example, it is preferable that the adjusting section have a common portion which is provided along an extension direction of the adjusting arm, and a plurality of branching portions which branch off from the common portion toward both sides in the width direction and are arranged in the extension direction, and cutting of the branching portions be included.

By cutting the branching portions, the piezoelectric layer or the electrode area of the second electrode of the adjusting section can be reduced as much as arbitrary branching portions among the plurality of branching portions. Moreover, since the plurality of branching portions are lined up along the extension direction of the adjusting arm, the signal output of the adjusting section may be adjusted simply and with high accuracy according to the positions and the number of branching portions being cut.

Application Example 10

This application example is directed to an angular velocity sensor including: the vibrator element according to the application example described above; an electronic component which includes a circuit that drives a drive vibrating arm and a circuit that detects a signal from the detecting section; and a package which stores the vibrator element and the electronic component.

According to this application example, an angular velocity sensor which exhibits the effects of the vibrator element described in the application example described above can be provided.

Moreover, a package type angular velocity sensor configured as above has advantageous characteristics being reduced in size and thickness and having high impact resistance.

Application Example 11

This application example is directed to an electronic device including: the vibrator element according to the application example described above.

According to this application example, since the vibrator element having high sensitivity is included in which adjustment for suppressing a leakage output is performed the electronic device having high functional and stable characteristics can be provided.

Application Example 12

This application example is directed to a moving body including: the vibrator element according to the application example described above.

The vibrator element (or the angular velocity sensor) can detect the attitude of the moving body. As described above, since the vibrator element having high sensitivity is included in which adjustment for suppressing a leakage output is performed, a moving body capable of stably controlling the attitude can be provided.

BRIEF DESCRIPTION OF THE DRAWINGS

The invention will be described with reference to the accompanying drawings, wherein like numbers reference like elements.

FIG. 1A is a plan view, and FIG. 1B is a cross-sectional view illustrating a surface taken along line A-A of FIG. 1A.

FIG. 10A is a plan view, and FIG. 10B is a cross-sectional view illustrating a surface taken along line B-B of FIG. 10A.

DESCRIPTION OF EXEMPLARY EMBODIMENTS

Hereinafter, embodiments of the invention will be described with reference to the drawings.

In addition, the drawings referred in the following description are schematic diagrams in which the vertical and horizontal scales of each member or part are different from the actual scales in order to cause each of the members to have a recognizable size.

Embodiment 1

Figure 1A:
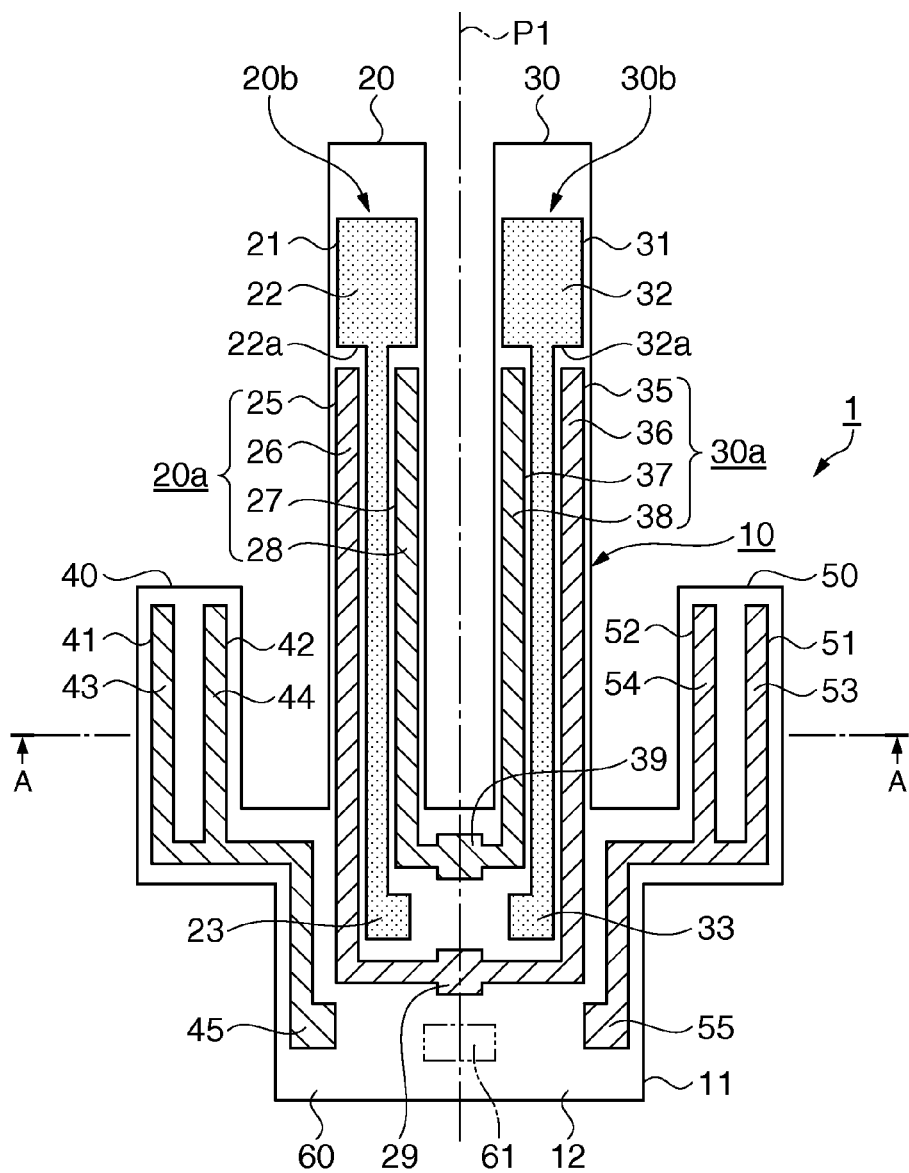
FIGS. 1A and 1B illustrate a vibrator element according to Embodiment 1.
Figure 1B:
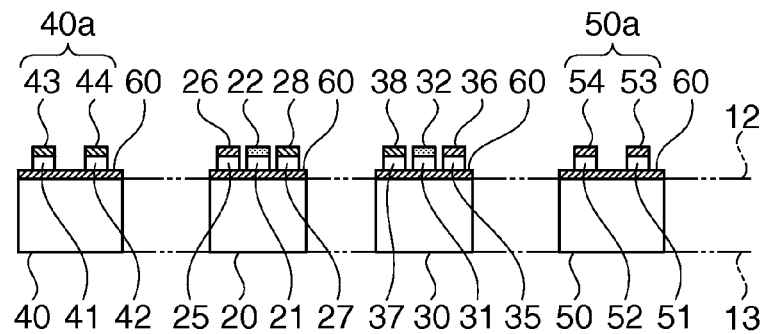

FIGS. 1A and 1B illustrate a vibrator element 1 according to Embodiment 1, FIG. 1A is a plan view, and FIG. 1B is a cross-sectional view illustrating a surface taken along line A-A of FIG. 1A. In addition, the vibrator element 1 of this embodiment is used as a sensor element such as an angular velocity sensor. In FIGS. 1A and 1B, the vibrator element 1 is constituted by a main body portion 10 made of a non-piezoelectric body, a piezoelectric layer formed in a predetermined pattern on a principal surface 12 of the main body portion 10, and a second electrode formed on the surface of the piezoelectric layer. Vibrating arms 20 and 30 extend in parallel in the same direction from a side of a base portion 11. As illustrated in FIG. 1A, the main body portion 10 together with the base portion 11 and the vibrating arms 20 and 30 constitute a tuning fork.

The main body portion 10 further has adjusting arms 40 and 50 which extend in the same direction as the vibrating arms 20 and 30 respectively from sides that are orthogonal to the side from which the vibrating arms 20 and 30 of the base portion 11 extend and oppose each other. The adjusting arms 40 and 50 are shorter than the vibrating arms 20 and 30. In addition, the main body portion 10 is formed of, for example, silicon (Si).

Hereinafter, the principal surface 12 represents a first principal surface 12, and a surface that opposes the first principal surface (the rear surface to the first principal surface 12) is represented by a second principal surface 13. In addition, the second principal surface 13 is a fixing surface for fixing the vibrator element 1 to a package, which will be described later.

As illustrated in FIGS. 1A and 1B, a first electrode 60 is formed on the first principal surface 12 of the main body portion 10. In a case where the main body portion 10 has conductivity, an insulating layer is formed between the first principal surface 12 and the first electrode 60. At the center portion in the width direction of the vibrating arm 20, the first electrode 60, a detection piezoelectric layer 21, and a detection electrode 22 are laminated from the first principal surface 12 to be formed. A pattern configured by the first electrode 60, the detection piezoelectric layer 21, and the detection electrode 22 is referred to as a first detecting section 20b. A wide portion 22a is formed at the tip end portion on the opposite side to the base portion 11 of the first detecting section 20b. In addition, the detection electrode 22 extends to a detection terminal 23 on the base portion 11.

At the center portion in the width direction of the vibrating arm 30, the first electrode 60, a detection piezoelectric layer 31, and a detection electrode 32 are laminated from the first principal surface 12 to be formed. A pattern configured by the first electrode 60, the detection piezoelectric layer 31, and the detection electrode 32 is referred to as a second detecting section 30b. A wide portion 32a is formed at the tip end portion on the opposite side to the base portion 11 of the second detecting section 30b. In addition, the detection electrode 32 extends to a detection terminal 33 on the base portion 11.

In the vibrating arm 20, on both sides in the width direction with the first detecting section 20b interposed therebetween, the first electrode 60, a drive piezoelectric layer 25, and a drive electrode 26, and the first electrode 60, a drive piezoelectric layer 27, and a drive electrode 28 are respectively laminated from the first principal surface 12 to be formed. The drive piezoelectric layers and the drive electrodes are collectively referred to as a first drive section 20a.

In the vibrating arm 30, on both sides in the width direction with the second detecting section 30b interposed therebetween, the first electrode 60, a drive piezoelectric layer 35, and a drive electrode 36, and the first electrode 60, a drive piezoelectric layer 37, and a drive electrode 38 are respectively laminated from the first principal surface 12 to be formed. The drive piezoelectric layers and the drive electrodes are collectively referred to as a second drive section 30*a*.

The drive electrode 26 and the drive electrode 36 are connected to a common drive terminal 29 on the first principal surface 12 of the base portion 11.

In addition, the drive electrode 28 and the drive electrode 38 are connected to a common drive terminal 39 on the first principal surface 12 of the base portion 11.

In the adjusting arm 40, the first electrode 60, adjustment piezoelectric layers 41 and 42 and adjustment electrodes 43 and 44 are respectively laminated from the first principal surface 12 to be formed, and the layer of the adjustment piezoelectric layer 41 and the adjustment electrode 43 and the layer of the adjustment piezoelectric layer 42 and the adjustment electrode 44 branch off from one end of the base portion 11 side in the width direction of the adjusting arm 40. The adjustment piezoelectric layers 41 and 42 and the adjustment electrodes 43 and 44 formed in the adjusting arm 40 are collectively referred to as a first adjusting section 40*a*. The adjustment electrode 43 and the adjustment electrode 44 are connected to an adjustment terminal 45 on the first principal surface 12.

On the other hand, in the adjusting arm 50, the first electrode 60, adjustment piezoelectric layers 51 and 52 and adjustment electrodes 53 and 54 are respectively laminated from the first principal surface 12 to be formed, and the layer of the adjustment piezoelectric layer 51 and the adjustment electrode 53 and the layer of the adjustment piezoelectric layer 52 and the adjustment electrode 54 branch off from the one end of the base portion 11 side in the width direction of the adjusting arm 50. The adjustment piezoelectric layers 51 and 52 and the adjustment electrodes 53 and 54 formed in the adjusting arm 50 are collectively referred to as a second adjusting section 50*a*. The adjustment electrode 53 and the adjustment electrode 54 are connected to an adjustment terminal 55 on the first principal surface 12.

As described above, the first electrode 60 is an electrode common to the first and second drive sections 20*a* and 30*a*, the first and second detecting sections 20*b* and 30*b*, and the first and second adjusting sections 40*a* and 50*a*, and is the ground electrode in this embodiment. A ground terminal 61 illustrated in FIG. 1A is a part of the first electrode 60.

Here, the detection terminals 23 and 33, the drive terminals 29 and 39, the adjustment terminals 45 and 55, and the ground terminal 61 are connection terminals electrically connected to an IC chip as an electronic component described later.

In addition, as illustrated in FIG. 1A, the external shape of the main body portion 10, and the piezoelectric layers and the electrodes described above are symmetrical with respect to an axial line P1.

In the vibrator element 1 according to this embodiment described above, regarding a leakage output of the detecting sections (the first and second detecting sections 20*b* and 30*b*) caused by variations (particularly, the cross-sections are asymmetric) in the shapes of the vibrating arms 20 and 30, charges in antiphase to a leakage signal are generated by the first and second adjusting sections 40*a* and 50*a* to cancel out the leakage output. In addition, by removing parts of the adjustment piezoelectric layers 41, 42, 51, and 52 of the first and second adjusting sections 40*a* and 50*a*, the frequencies of the adjusting arms are caused to approach a drive frequency, and the total amount of adjustment charges can be increased. In addition, by removing parts of the adjustment electrodes 43, 44, 53, and 54, the amplitude (leakage current) of the leakage signal is adjusted to be a target value or less, thereby suppressing vibration leakage.

In addition, prunable masses of the adjustment piezoelectric layers 41, 42, 51, and 52 of the first and second adjusting sections 40*a* and 50*a* are respectively greater than those of the adjustment electrodes 43, 44, 53, and 54, which is effective in adjusting the adjusting arm frequencies. In addition, the adjustment electrodes 43, 44, 53, and 54 are effective in adjusting charge amounts. Accordingly, coarse adjustment and fine adjustment are possible, and a range in which vibration leakage is suppressed is enlarged. Therefore, there is an effect of precise suppression.

In addition, at the tip end portions of the first and second detecting sections 20*b* and 30*b* on the opposite side to the base portion 11, wide portions 22*a* and 32*a* having a greater area than other parts of the first and second detecting sections 20*b* and 30*b* are provided closer to the tip end side than the first and second drive sections 20*a* and 30*a*. Detection sensitivity is determined by the product to the magnitude of the vibration amplitude excited by the drive section and a charge generation efficiency of the detecting section. Here, by providing the wide detecting section closer to the tip end side than the drive section, detection sensitivity can be increased.

In addition, since a change in the charge amount by the adjustment of the tip end portions of the vibrating arms 20 and 30 is small, when it is thought that the wide portions 22*a* and 32*a* are added mass portions, they may be used as adjusting sections of the detection frequencies.

In addition, in the vibrator element 1, the lengths of the adjusting arms 40 and 50 are shorter than the lengths of the vibrating arms 20 and 30. In this manner, vibration of the adjusting arms 40 and 50 for adjusting the leakage output does not impede vibration of the vibrating arms 20 and 30 that function as both a drive vibrating arm and a detection vibrating arm. Therefore, vibration characteristics of the vibrator element 1 are stabilized, and there is an advantage of a reduction in the size of the vibrator element 1.

Moreover, the adjustment piezoelectric layers 41 and the adjustment piezoelectric layers 51 and 52 respectively branch off in the width directions of the adjusting arms 40 and 50 and extend in the lengthwise directions. The vibration directions thereof are in-plane flexural vibration with respect to the first principal surface 12. For example, a + charge is generated by the adjustment piezoelectric layer 51 compressed by flexural vibration, and a − charge is generated in a case of the adjustment piezoelectric layer 52 elongated. Therefore, since the adjustment piezoelectric layers 51 and 52 branch off, one of the branching portions generates the + charge, and the other thereof generates the − charge. Therefore, when the sum of the amounts of generated charges is obtained, the sum may be output as adjustment charges of the leakage signal.

Method of Manufacturing Vibrator Element 1 According to Embodiment 1

Subsequently, a method of manufacturing the vibrator element 1 according to Embodiment 1 will be described.

In the vibrator element 1 described above, the main body portion 10 is formed in one body by performing etching processing on a non-piezoelectric material such as Si using photolithography. Originally, the cross-sectional shapes of the vibrating arms 20 and 30 are designed to be a rectangular shape, but due to etching anisotropy of the non-piezoelectric material, variations in the processing process, and the like, show a parallelogram shape, a rhombus shape, or more complex indeterminate shapes instead of the rectangular shape. Here, when the cross-sectional shapes of the vibrating arms 20 and 30 significantly deviate from the designed rectangular shape, the vibration directions of the vibrating arms 20 and 30 deviate from designed values, and undesirable vibration leakage so-called a leakage output occurs, which is the cause of deterioration of the detection sensitivity of an angular velocity sensor. Hereinbelow, a method of suppressing such a leakage output will be mainly described.

Figure 2:
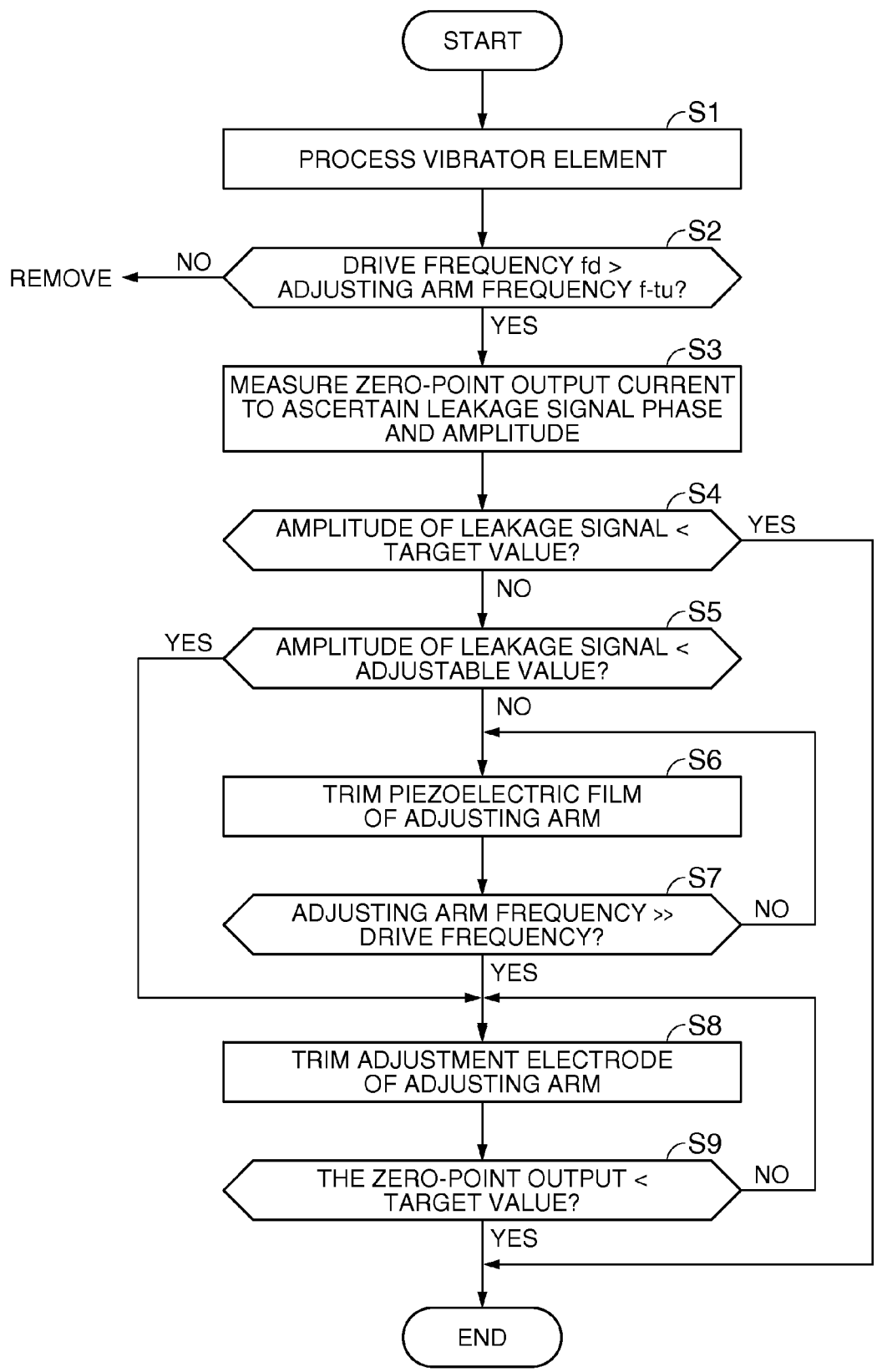
FIG. 2 is an explanatory view illustrating processes of a method of suppressing a leakage output by the vibrator element according to Embodiment 1.

FIG. 2 is an explanatory view illustrating processes of the method of suppressing a leakage output by the vibrator element 1 according to this embodiment. First, the vibrator element 1 is formed (Step 1: S1). In order to form the vibrator element 1, a Si wafer is subjected to etching processing using photolithography so as to form the main body portion 10 as illustrated in FIGS. 1A and 1B. Thereafter, the first electrode layer, the piezoelectric layer, and the second electrode layer are laminated on the first principal surface 12 of the main body portion 10 in this order so as to be formed, and the second electrode layer and the piezoelectric layer are patterned in this order as illustrated in FIGS. 1A and 1B using a well-known patterning technique. As the piezoelectric layer, for example, a film of PZT (lead zirconate titanate) is formed with a thickness of 1 μm to 3 μm, and as the first and second electrode layers, for example, films of Au or Cr—Au are formed with thicknesses of 500 Å to 2000 Å.

Here, driving and detection of the vibrator element 1 will be described with reference to FIG. 3.

Figure 3:
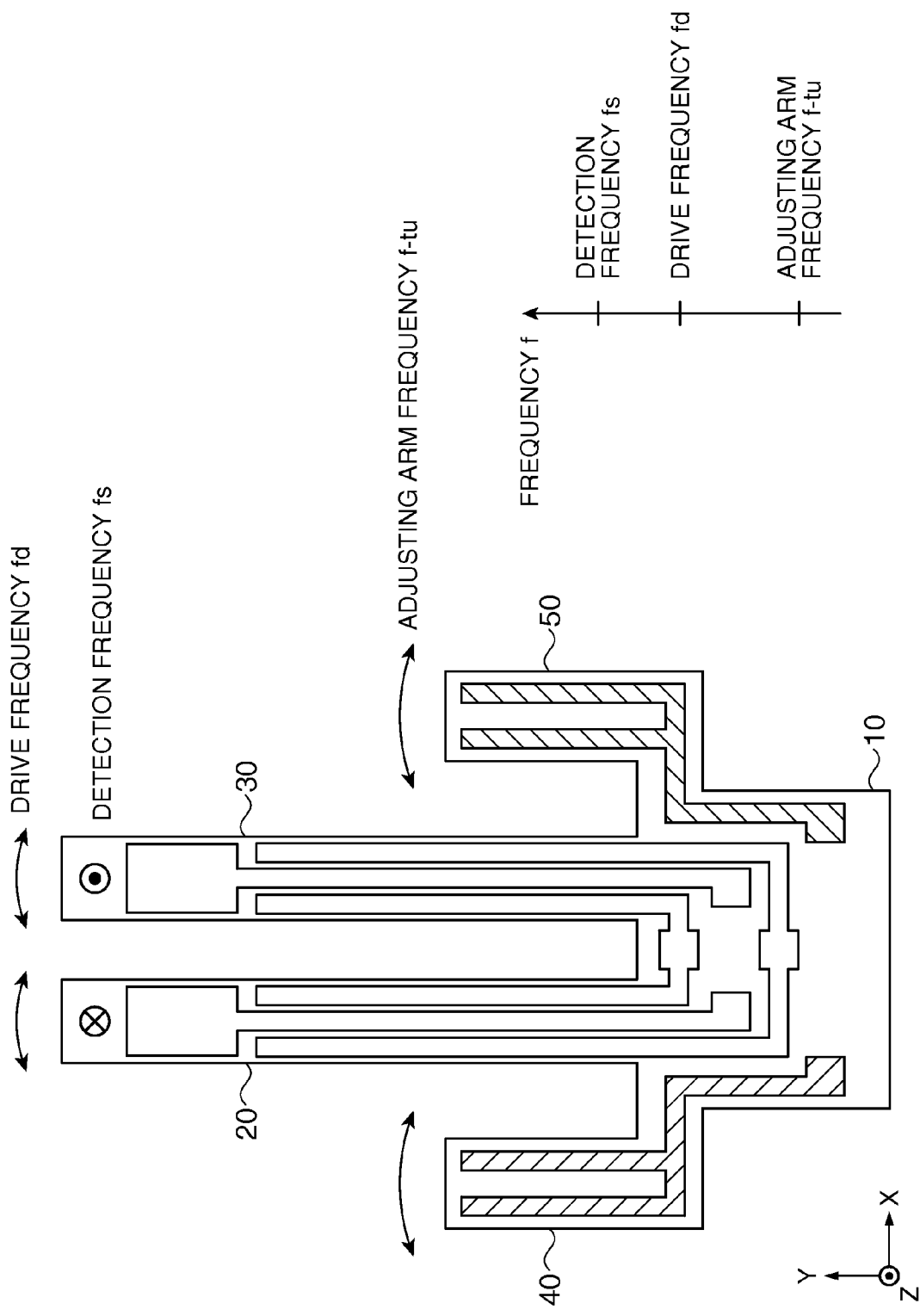
FIG. 3 is an explanatory view of driving and detection of the vibrator element.

FIG. 3 is an explanatory view of driving and detection of the vibrator element 1. When a drive signal is applied to the drive terminals 29 and 39, the vibrating arms and 30 undergo flexural vibration in the X direction (so-called tuning fork vibration). The frequency of the drive signal is denoted by fd. At this time, when the frequency of the adjusting arms 40 and 50 is close to the drive frequency fd, vibration is transmitted via the base portion 11, and thus the adjusting arms 40 and 50 undergo flexural vibration in the X direction. The frequency of the adjusting arms 40 and 50 is denoted by f-tu. The adjusting arms 40 and 50 vibrate in antiphase to the vibrating arms 20 and 30.

In the vibrator element 1 having such a configuration, the vibrating arms 20 and 30 vibrate in the Z direction due to the Coriolis force (called walk mode vibration) when angular velocity is added to the vibrator element 1 in a state where a predetermined drive signal is applied to the vibrating arms 20 and 30 so as to vibrate, such that a detection signal is output. The frequency of this detection vibration is denoted by fs.

Formation of the shape of the main body portion 10 is performed so that, when the vibrator element 1 is formed, the relationship between the drive frequency (fd), the adjusting arm frequency (f-tu), and the detection frequency (fs) is fs>fd>f-tu, that is, the adjusting arm frequency (f-tu) is lower than the drive frequency (fd).

Next, the vibrator element 1 determines whether or not the drive frequency (fd)>the adjusting arm frequency (f-tu) (Step 2: S2). Here, in a case of the drive frequency (fd)<the adjusting arm frequency (f-tu) (NO), this case is excluded from cases where it is difficult to suppress vibration leakage even by execution of subsequent processes. In a case of the drive frequency (fd)>the adjusting arm frequency (f-tu) (YES), zero-point output current is measured to ascertain the phase and the amplitude of a leakage signal (Step 3: S3). The zero-point output current is an output current of the adjusting arms 40 and 50 in a state where no angular velocity is added to the vibrator element 1.

Next, the amplitude of the leakage signal (the leakage current) and the target value are compared to each other (Step 4: S4). This will be described with reference to FIGS. 4A and 4B.

Figure 4:
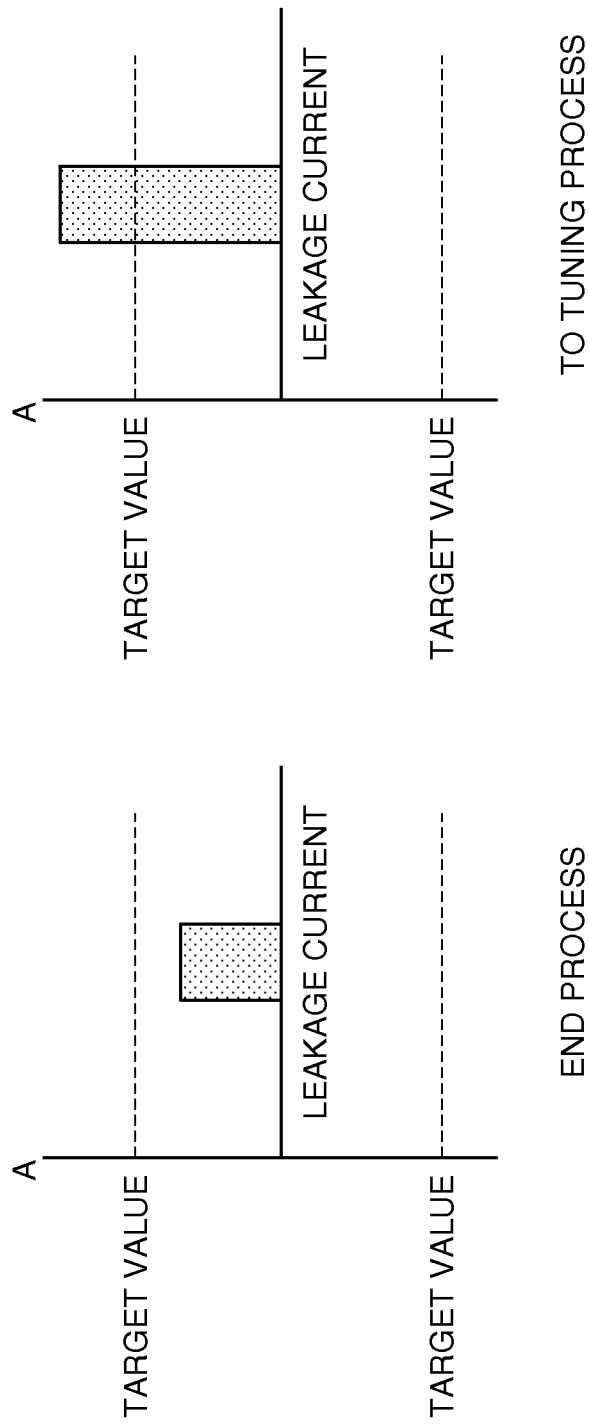
FIGS. 4A and 4B are explanatory views schematically illustrating the idea of Step 4 in FIG. 2.

FIGS. 4A and 4B are explanatory views schematically illustrating the idea of Step 4 in FIG. 2. When the amplitude of the leakage signal (the leakage current) is smaller than the target value installed in advance, a state where leakage vibration is suppressed is determined, and a process for suppressing leakage vibration is ended. In addition, when the amplitude of the leakage signal (the leakage current) is greater than the target value installed in advance (NO), the next process is performed.

Subsequently, comparison is performed to determine whether or not the amplitude (current) of the leakage signal is in a range of an adjustable value in the case of the amplitude of the leakage signal (the leakage current)>the target value (Step 5: S5). This will be described with reference to FIGS. 5A and 5B.

Figure 5:
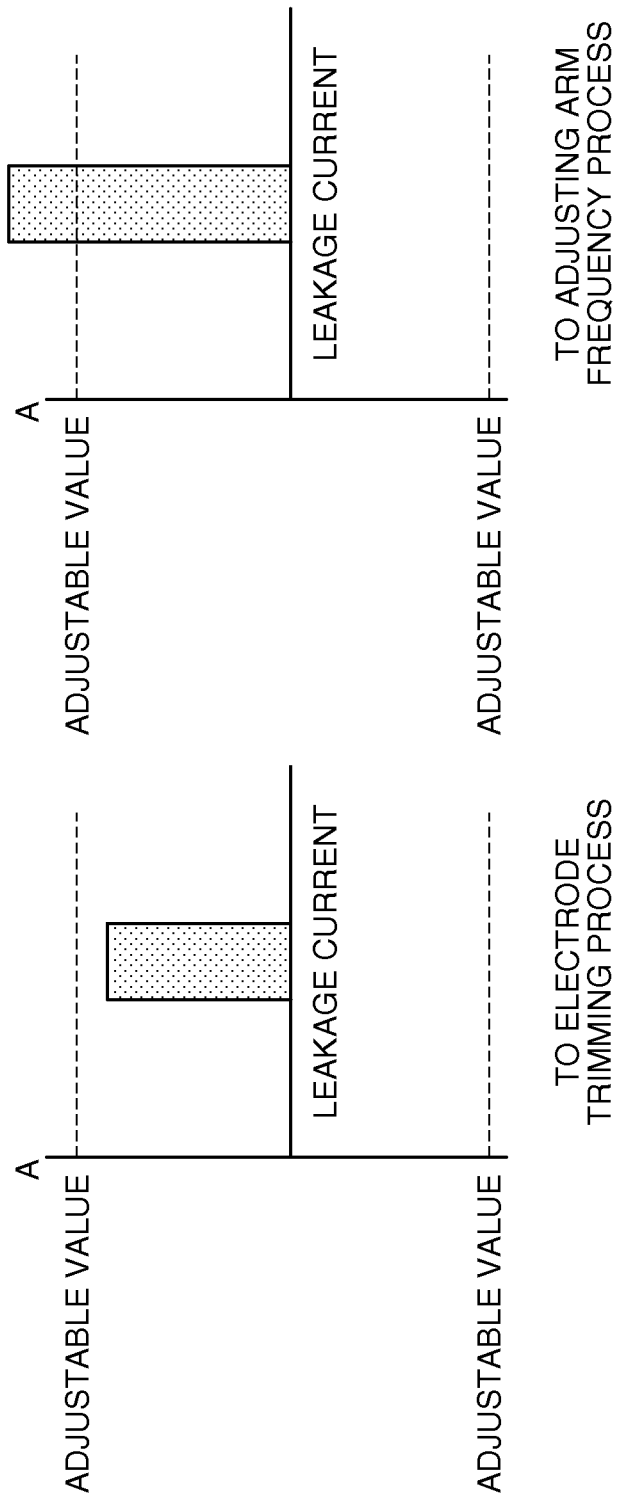
FIGS. 5A and 5B are explanatory views schematically illustrating the idea of Step 5 in FIG. 2.

FIGS. 5A and 5B are explanatory views schematically illustrating the idea of Step 5 in FIG. 2. Here, in a case of the amplitude of the leakage signal (the leakage current)<the adjustable value, it is determined that trimming of the adjustment piezoelectric layers 41, 42, 51, and 52 is unnecessary, and trimming of the adjustment electrodes 43, 44, 53, and 54 is performed (Step 8: S8). In addition, in a case of the amplitude of the leakage signal>the adjustable value, trimming of the adjustment piezoelectric layers 41, 42, 51, and 52 (Step 6: S6) is performed.

In addition, trimming is to remove parts of the adjustment piezoelectric layers 41, 42, 51, and 52 or the adjustment electrodes 43, 44, 53, and 54.

Next, trimming of the adjustment piezoelectric layers 41, 42, 51, and 52 will be described with reference to FIGS. 6A and 6B.

Figure 6:
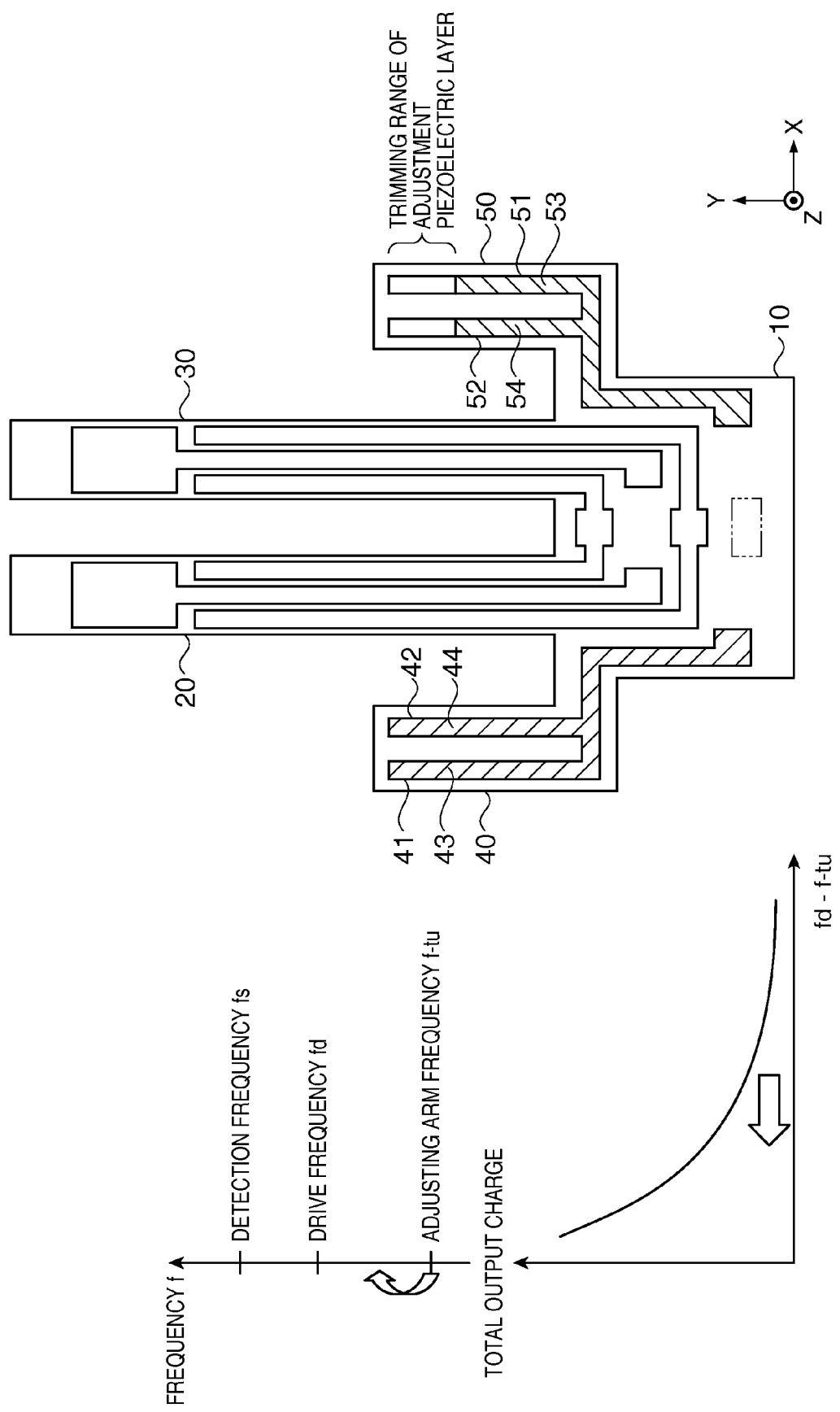
FIGS. 6A and 6B are explanatory views schematically illustrating the idea of Step 6 in FIG. 2.

FIGS. 6A and 6B are explanatory views schematically illustrating the idea of Step 6 in FIG. 2. Regarding the trimming of the adjustment piezoelectric layers 41, 42, 51, and 52, the relationship of a trimming amount and the difference between the amounts of output charges (the drive frequency (fd)−the adjusting arm frequency (f-tu)) is obtained in advance to calculate the trimming amount. As illustrated in FIG. 6A, as the difference between the drive frequency (fd) and the adjusting arm frequency (f-tu) is reduced, the total amount of output charge is increased. That is, a detection output is increased. Therefore, any of the adjustment piezoelectric layers 41, 42, 51, and 52 of the adjusting arms 40 and 50 is trimmed to cause the frequency of the adjusting arms 40 and to approach the drive frequency. Therefore, it is preferable that trimming be performed until the drive frequency (fd)≈the adjusting arm frequency (f-tu) is achieved.

Next, it is determined whether or not the drive frequency (fd)≈the adjusting arm frequency (f-tu) is achieved (Step 7: S7). In addition, an allowable difference between the drive frequency (fd) and the adjusting arm frequency (f-tu) (a target value of the difference) is set in advance with reference to FIG. 6B. Here, in a case where it is determined that the drive frequency (fd)≈the adjusting arm frequency (f-tu) is not achieved (NO), trimming of the adjustment piezoelectric layers 41, 42, 51, and 52 (Step 6) is performed until the difference between the drive frequency (fd) and the adjusting arm frequency (f-tu) reaches the allowable value. In a case where the difference between the drive frequency (fd) and the adjusting arm frequency (f-tu) is in an allowable value range (YES), a process of trimming of the adjustment piezoelectric layers 41, 42, 51, and 52 is performed.

FIG. 6B illustrates an example of the trimming of the adjustment piezoelectric layers 41, 42, 51, and 52.

In FIG. 6B, a case where parts of the adjustment piezoelectric layers 51 and 52 are removed is illustrated. However, there is a case where the adjustment piezoelectric layers 41 and 42 of the adjusting arm 40 side are trimmed, or there is a case where the adjustment piezoelectric layers of both the adjusting arm 40 and the adjusting arm 50 are trimmed.

The trimming of the adjustment piezoelectric layers 41, 42, 51, and 52 in Step 6 is performed by removing parts using a laser or the like, and the respective adjustment electrodes formed on the surfaces of the adjustment piezoelectric layers are removed together. In addition, the first electrode 60 in the same area may be simultaneously trimmed. This is because the effect of trimming of the adjustment electrodes on the adjusting arm frequency (f-tu) is much smaller than that of trimming of the adjustment piezoelectric layers.

When the difference between the drive frequency (fd) and the adjusting arm frequency (f-tu) is in the allowable value range (for example, the drive frequency (fd)≈the adjusting arm frequency (f-tu)), trimming of the adjustment electrodes of the first and second adjusting sections 40a and 50a is performed (Step 8: S8).

Next, the trimming of the adjustment electrodes of the adjusting arms 40 and 50 will be described with reference to FIGS. 7A and 7B.

Figure 7:
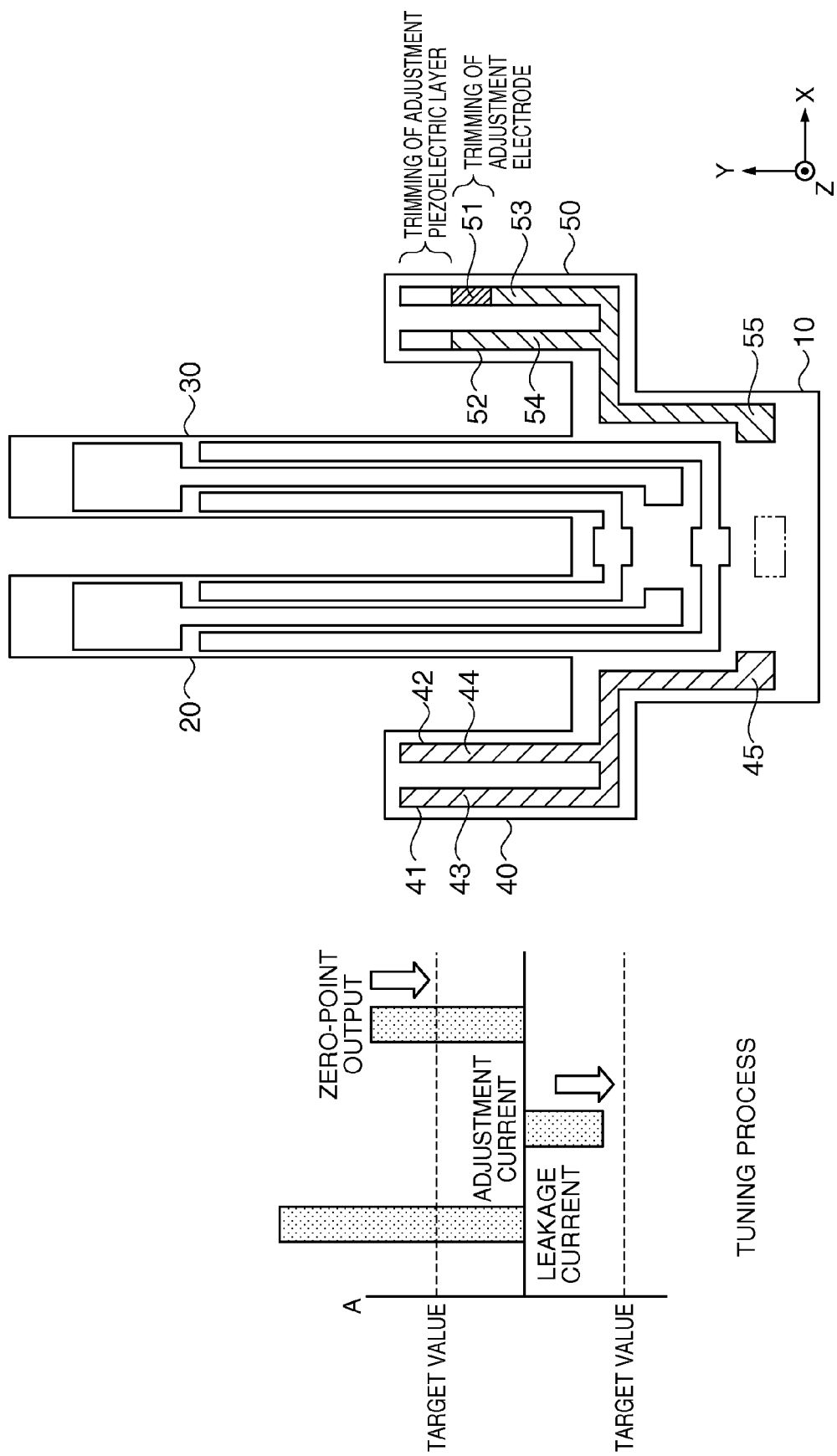
FIGS. 7A and 7B are explanatory views schematically illustrating the idea of Step 8 in FIG. 2.

FIGS. 7A and 7B are explanatory views schematically illustrating the idea of Step 8 in FIG. 2. As illustrated in FIG. 7A, first, a part of any of the adjustment electrodes 43, 44, 53, and 54 of the adjusting arms 40 and 50 is removed, and an output charge is generated. Subsequently, the trimming of the adjustment electrodes 43, 44, 53, and 54 is performed until the zero-point output reaches a target value. In FIG. 7B, the case where a part of the adjustment electrode 53 is removed is illustrated. However, there is a case where the adjustment electrode 54 is trimmed or there is a case where the adjustment electrodes 43 and 44 of the adjusting arm 40 side are trimmed. In addition, there is also a case where the adjustment electrodes of both the adjusting arms 40 and 50 are trimmed.

Here, the output charge of the adjusting arms 40 and 50 will be described. For example, in a case where the adjusting arm 40 displaces in the −X direction, the adjustment piezoelectric layer 41 is compressed and generates a + charge, whereas the adjustment piezoelectric layer 42 is elongated and generates a − charge. Since the adjustment electrodes 43 and 44 are connected to each other, the adjustment terminal 45 may detect the sum of the charge generated by the adjustment piezoelectric layer 41 and the charge generated by the adjustment piezoelectric layer 42 as the amount of output charge.

Even in the adjusting arm 50 side, as in the adjusting arm 40 side, the adjustment terminal 55 may detect the sum of the charge generated by the adjustment piezoelectric layer 51 and the charge generated by the adjustment piezoelectric layer 52 as the amount of charge.

Since the adjustment electrodes 43 and 44 of the adjusting arm 40 side and the adjustment electrodes 53 and 54 of the adjusting arm 50 side are electrically separated from each other, the amounts of charges generated by the adjusting arm 40 and the adjusting arm 50 can be individually ascertained. Therefore, adjustments of leakage current (the amplitude of the leakage signal) can be separately performed.

In Step 9, in a case where the zero-point output<the target value is not achieved (NO), trimming of the electrodes is further performed, and in a case where the zero-point output<the target value is achieved (YES), vibration leakage is suppressed and thus the tuning process is ended.

According to the method of manufacturing the vibrator element 1 described above, the prunable masses of the adjustment piezoelectric layers 41, 42, 51, and 52 of the first and second adjusting sections 40a and 50a are greater than those of the adjustment electrodes 43, 44, 53, and 54, which is effective in adjusting the adjusting arm frequency. In addition, the second electrodes on the piezoelectric layers are effective in adjusting the charge amounts. Accordingly, coarse adjustment and fine adjustment are possible, and a range in which vibration leakage is suppressed is enlarged.

Therefore, precise suppression can be performed and thus there is an effect of efficiently suppressing vibration leakage.

In addition, in Step 6 described above, trimming is performed by removing parts of the adjustment piezoelectric layers 41, 42, 51, and 52 of the adjusting arms, and in Step 8, trimming is performed by removing parts of the adjustment electrodes 43, 44, 53, and 54. However, even when parts are added to the two, the same effect is obtained.

Embodiment 2

Subsequently, a vibrator element 2 according to Embodiment 2 will be described. In Embodiment 2, adjusting sections constituted by adjustment piezoelectric layers and adjustment electrodes provided in the adjusting arms 40 and respectively have common portions that extend in the extension directions of the adjusting arms 40 and 50 and a plurality of branching portions that branch off from the common portions toward both sides in the width direction and are arranged in the extension direction. Therefore, different elements from those of Embodiment 1 will be mainly described by denoting like elements that are common to those of Embodiment 1 with like reference numerals.

Figure 8:
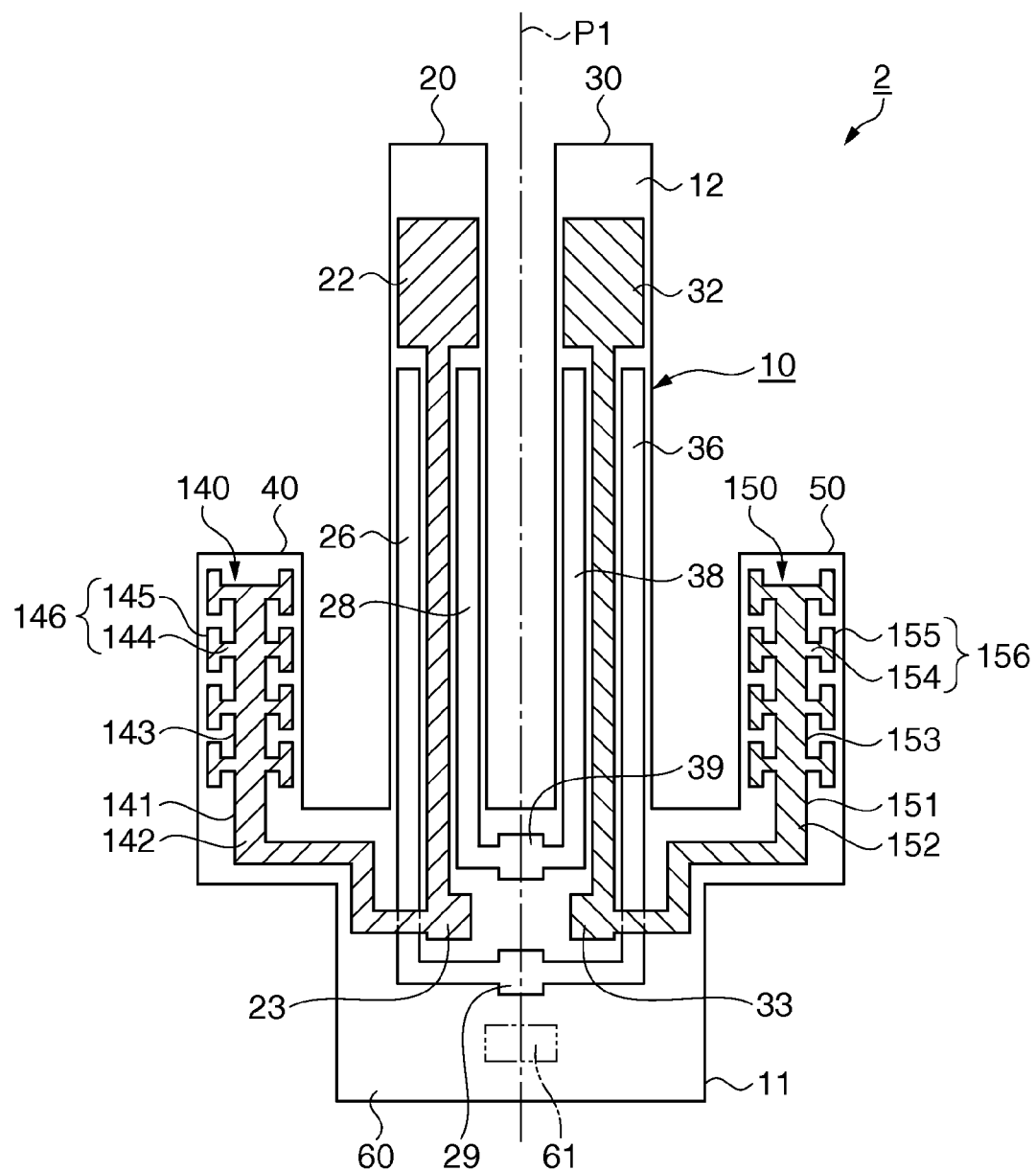
FIG. 8 is a plan view illustrating a vibrator element according to Embodiment 2.

FIG. 8 is a plan view illustrating the vibrator element 2 according to Embodiment 2. The vibrating arms 20 and 30 extend in parallel in the same direction from a side of the base portion 11, and the adjusting arms 40 and 50 which extend in the same direction as the vibrating arms 20 and 30 respectively from sides that are orthogonal to the side from which the vibrating arms 20 and 30 of the base portion 11 extend and oppose each other. The adjusting arms 40 and 50 are shorter than the vibrating arms 20 and 30. The main body portion 10 is formed of, for example, Si. The shape of the main body portion 10 and the patterns of the drive piezoelectric layers and the detection electrodes respectively formed in the vibrating arms 20 and 30 are the same as those of Embodiment (see FIG. 1A). In addition, the first electrode (common electrode) 60 is formed on the surface of the first principal surface 12 of the main body portion 10.

As illustrated in FIG. 8, the adjusting arm 40 is provided with a first adjusting section 140 constituted by an adjustment piezoelectric layer 141 and an adjustment electrode 142. The first adjusting section 140 has a common portion 143 that extends in the lengthwise direction at substantially the center portion in the width direction, and branching portions 146 formed by narrow portions 144 that branch off from the common portion 143 toward both sides in the width direction and wide portions 145 that extend from the tip ends of the narrow portions 144. In FIG. 8, a case where a total of eight branching portions 146, four branching portions 146 per side in the lengthwise direction, are arranged is illustrated. However, the number of branching portions 146 is not limited thereto.

Similarly, the adjusting arm 50 is provided with a second adjusting section 150 constituted by an adjustment piezoelectric layer 151 and an adjustment electrode 152. The second adjusting section 150 has a common portion 153 that extends in the lengthwise direction at substantially the center portion in the width direction, and branching portions 156 formed by narrow portions 154 that branch off from the common portion 153 toward both sides in the width direction and wide portions 155 that extend from the tip ends of the narrow portions 154. In FIG. 8, a case where a total of eight branching portions 156, four branching portions 156 per side in the lengthwise direction, are arranged is illustrated. However, the number of branching portions 156 is not limited thereto.

In addition, the first adjusting section 140 and the second adjusting section 150 are symmetric with respect to the axial line P1.

The adjustment electrode 142 is connected to the detection electrode 22 provided in the vibrating arm 20 with the detection terminal 23. In addition, the adjustment electrode 152 is connected to the detection electrode 32 provided in the vibrating arm 30 with the detection terminal 33.

In addition, an intersection portion between the adjustment electrode 142 and the drive electrode 26, and an intersection portion between the adjustment electrode 152 and the detection electrode 32 are provided with insulating layers (not illustrated).

In addition, a method of suppressing leakage vibration by the vibrator element 2 according to this embodiment may be performed in the same idea as that of Embodiment 1 (see FIG. 2) described above. For example, in Step 6, trimming of the adjustment piezoelectric layers 141 and 151 of the adjusting arms 40 and 50 is performed. However, in this embodiment, as illustrated in FIG. 6A, the relationship of a trimming amount and the amount of output charge increased (the drive frequency (fd)–the adjusting arm frequency (f-tu)) is obtained in advance to calculate the trimming amount, and any of the plurality of branching portions 146 and 156 may be selected and cut to achieve the adjusting arm frequency (f-tu) ≈the drive frequency (fd).

In addition, regarding the trimming of the adjustment electrodes in Step 8, the adjustment electrodes 142 and 143 of the plurality of branching portions 146 and 156 that remain after cutting the above branching portions are trimmed, thereby adjusting the amplitude of the leakage signal (leakage current) to be the target value or less. Here, the adjustment electrodes 142 and 143 may be cut for each of the branching portions or an arbitrary amount thereof may be cut.

According to Embodiment 2 described above, since the plurality of branching portions 146 branch off from the common portion 143, even when arbitrary branching portions are cut, an electrically connected state can be maintained. That is, when only arbitrary branching portions from the plurality of branching portions 146 of the first adjusting section 140 or the second adjusting section 150 are cut, suppression of vibration leakage can be realized.

In addition, when the relationship of a trimming amount (the positions and the number of branching portions 146 and 156 to be cut) and the amount of output charge increased (the drive frequency (fd)–the adjusting arm frequency (f-tu)) is calculated in advance, suppression of vibration leakage can be realized efficiently.

In addition, the detection electrode 22 and the adjustment electrode 142 are electrically connected to each other, and the detection electrode 32 and the adjustment electrode 152 are electrically connected to each other. Electric signals generated by the adjusting arms 40 and 50 overlap output signals of the detection electrodes 22 and 23. Accordingly, leakage vibration components can be cancelled out by the output signals of the adjusting arms 40 and 50.

In addition, even in the vibrator element 1 of Embodiment 1 described above, a configuration in which the detection electrode 22 is electrically connected to the adjustment electrodes 43 and 44, and the detection electrode 32 is electrically connected to the adjustment electrodes 53 and 54 may be employed.

In addition, in consideration of the roles of the trimming of the adjustment piezoelectric layers and the trimming of the adjustment electrodes described above, a configuration in which, among the branching portions of the first and second adjusting sections 140 and 150, the branching portions on the tip end side do not function as the adjustment electrode may be employed.

Embodiment 3

Subsequently, a vibrator element 3 according to Embodiment 3 will be described. In Embodiment 3, weight portions are provided at the tip end portions of the adjusting arms 40 and 50 and adjusting sections are provided on the base portion 11 side. Therefore, different elements from those of Embodiment 1 will be mainly described by denoting like elements that are common to those of Embodiment 1 with like reference numerals.

Figure 9:
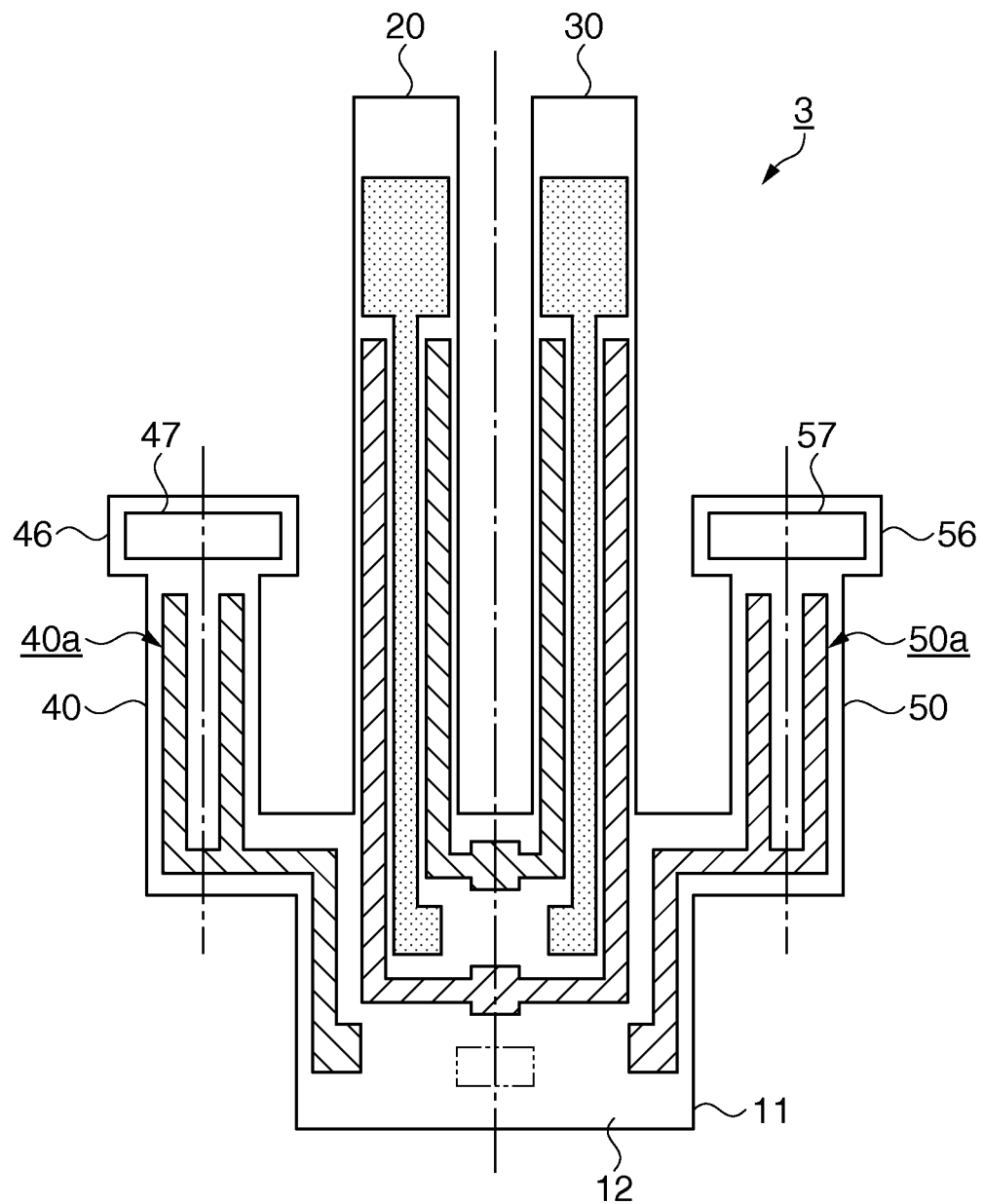
FIG. 9 is a plan view illustrating a vibrator element according to Embodiment 3.

FIG. 9 is a plan view illustrating the vibrator element 3 according to Embodiment 3. As illustrated in FIG. 9, a wide weight portion 46 is formed at the tip end portion of the adjusting arm 40, and a wide weight portion 56 is formed at the tip end portion of the adjusting arm 50. In the adjusting arm 40, a first adjusting section 40a is formed at a position distant from the weight portion 46, and in the adjusting arm 50, a second adjusting section 50a is formed at a position distant from the weight portion 56. The first and second adjusting sections 40a and 50a have the same configurations as those of Embodiment 1 (see FIGS. 1A and 1B).

An adjustment piezoelectric layer 47 is formed on the first principal surface 12 of the weight portion 46, and an adjustment piezoelectric layer 57 is formed on the first principal surface 12 of the weight portion 56.

A method of suppressing leakage vibration by the vibrator element 3 may follow the same tuning processes (see FIG. 2) as those of Embodiment 1 described above. However, by providing the weight portions 46 and 56 in the tip end portions of the adjusting arms 40 and 50 and trimming the adjustment piezoelectric layers 47 and 57 that are present in the tip end portions, the adjustment range of the adjusting arm frequency can be further enlarged. In addition, in consideration of the efficiency of manufacture of the vibrator element 3, second electrodes may be formed on the surface of the adjustment piezoelectric layers 47 and 57.

As such, since the weight portions 46 and 56 are provided on the tip end sides of the adjusting arms 40 and 50, an effect of suppressing leakage vibration can be enhanced while suppressing an increase in the lengths of the adjusting arms 40 and 50, and the adjustment range for suppressing leakage vibration is widened. Therefore, by trimming the first and second adjusting sections 40a and 50a, precise adjustment for suppressing leakage vibration can be achieved.

In FIG. 9, the first and second adjusting sections 40a and 50a having the same configuration as that of Embodiment 1 are illustrated, but the same configuration as that of Embodiment 2 (see FIG. 8) may also be applied.

In addition, each of the piezoelectric layers is not limited to lead zirconate titanate (PZT), and for example, an oxide substrate such as aluminum nitride (AlN), lithium niobate ($LiNbO_3$), lithium tantalate ($LiTaO_3$), lithium tetraborate ($Li_2B_4O_7$), and langasite ($La_3Ga_5SiO_{14}$), a laminated piezoelectric substrate configured by laminating a piezoelectric material such as aluminum nitride or tantalum pentoxide ($Ta_2O_5$) on a glass substrate, piezoelectric ceramics, and the like may be used.

In addition, all the vibrator elements 1, 2, and 3 of the respective embodiments described above have a form in which the vibrating arms 20 and 30 include the first and second drive sections 20a and 30a and the first and second detecting sections 20b and 30b and the vibrating arm is also used as a detecting arm. However, a so-called H type vibrator element in which a vibrating arm and a detecting arm are separately provided can also be applied.

Angular Velocity Sensor

Subsequently, an angular velocity sensor which uses the vibrator element 1 described above will be described.

Figure 10A:
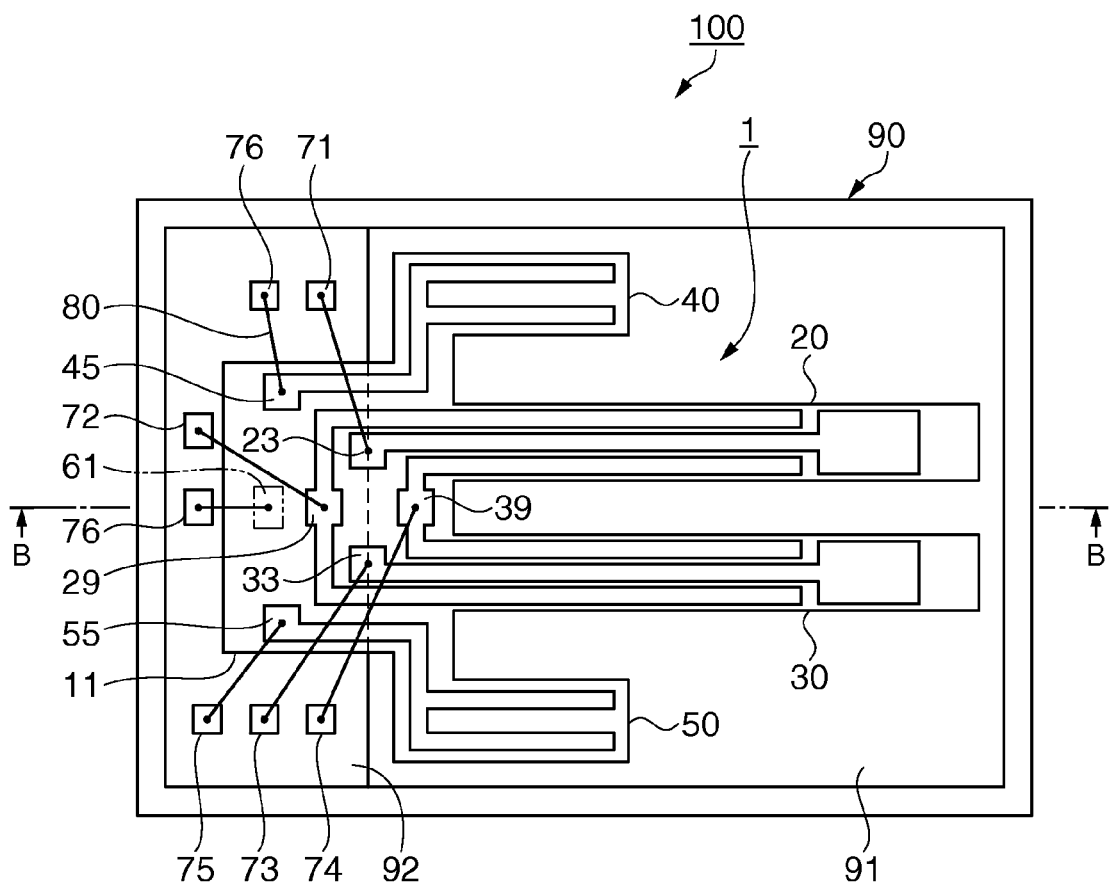
FIGS. 10A and 10B illustrate a schematic configuration of an angular velocity sensor.
Figure 10B:
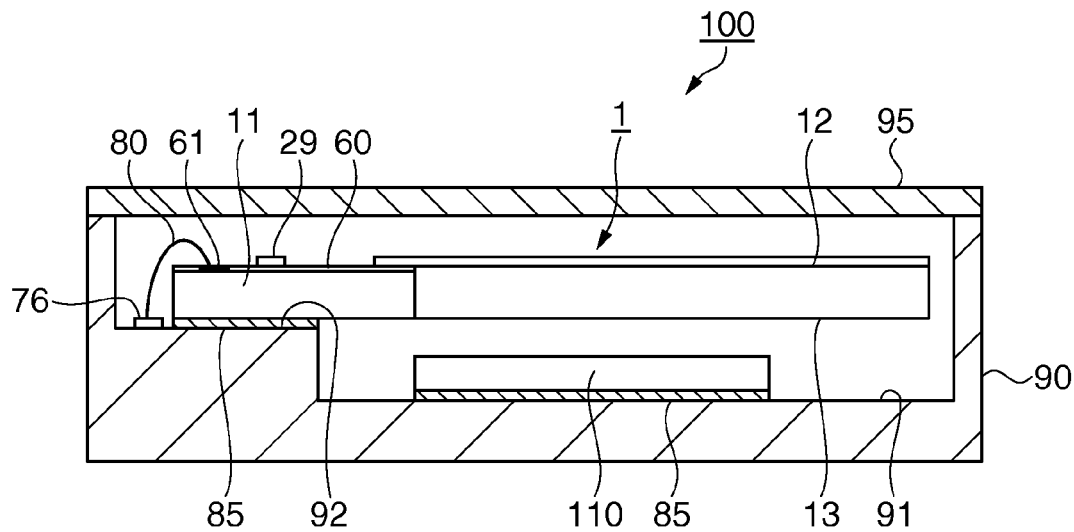

FIGS. 10A and 10B illustrate a schematic configuration of the angular velocity sensor, FIG. 10A is a plan view, and FIG. 10B is a cross-sectional view illustrating a surface taken along line B-B of FIG. 10A. In addition, FIG. 10A illustrates a state where a lid member is seen through. In FIGS. 10A and 10B, the angular velocity sensor 100 is constituted by the vibrator element 1 as a sensor element, an IC chip 110 as an electronic component which includes a circuit that drives the vibrator element 1 and a circuit that detects a signal from the detecting section (none of which are illustrated), and a package that stores the vibrator element 1 and the IC chip 110.

The package is configured to have an internal space between a package body 90 and a lid 95 as the lid member, and the vibrator element 1 and the IC chip 110 are stored in the internal space. The package body 90 is a container which is molded of ceramic or the like and has a rectangular planar shape. Inside the package body 90, a bottom surface having a two stage configuration is provided, and the IC chip 110 is fixed to a lowermost bottom surface 91 by an adhesive 85. In addition, the vibrator element 1 is fixed to an upper bottom surface 92 by an adhesive 85. The vibrator element 1 is disposed above the IC chip 110. In the vibrator element 1, the second principal surface 13 is fixed to the upper bottom surface 92 of the package body 90 by the adhesive 85.

In addition, for the angular velocity sensor 100, in FIGS. 10A and 10B, the vibrator element 1 of Embodiment 1 described above is illustrated. However, the vibrator element 2 of Embodiment 2 and the vibrator element 3 of Embodiment 3 may also be applied.

On the upper bottom surface 92 of the package body 90, connection terminals 71 to 76 are formed. The connection terminals are connected to the connection terminals provided on the first principal surface 12 of the vibrator element 1. Specifically, the detection terminal 23, the detection terminal 33, the drive terminal 29, the drive terminal 39, the adjustment terminal 45, and the adjustment terminal 55 are respectively connected to the connection terminal 71, the connection terminal 73, the connection terminal 72, the connection terminal 74, the connection terminal 76, and the connection terminal 75 by bonding wires 80. Each of the connection terminals 71 to 76 are connected to terminals provided in the IC chip 110 by wires that are provided to be continuous over the upper bottom surface 92 and the lowermost bottom surface 91 of the package body 90.

The angular velocity sensor 100 is configured by fixing the IC chip 110 and the vibrator element 1 to the inside of the package body 90, electrically bonding the two, and thereafter fixing the lid 95 to the peripheral portion of the package body 90. It is preferable the inside of the package be in a vacuum state. In addition, although illustration is omitted, external terminals are provided outside the package, and a plurality of external terminals that supply power to the IC chip 110 or output signals from the IC chip 110 are provided.

The angular velocity sensor 100 configured as described above exhibits the effects described in each of Embodiments by using any of the vibrator elements 1, 2, and 3 of Embodiments 1, 2, and 3 described above.

In addition, the package type angular velocity sensor 100 configured as above has advantageous characteristics being reduced in size and thickness and having high impact resistance.

Electronic Device

Subsequently, an electronic device including the angular velocity sensor 100 which uses any of the vibrator elements 1, 2, and 3 of Embodiments 1 to 3 described above will be described by employing a smartphone and a digital camera as specific examples and a car as an example of a moving body.

Figure 11:
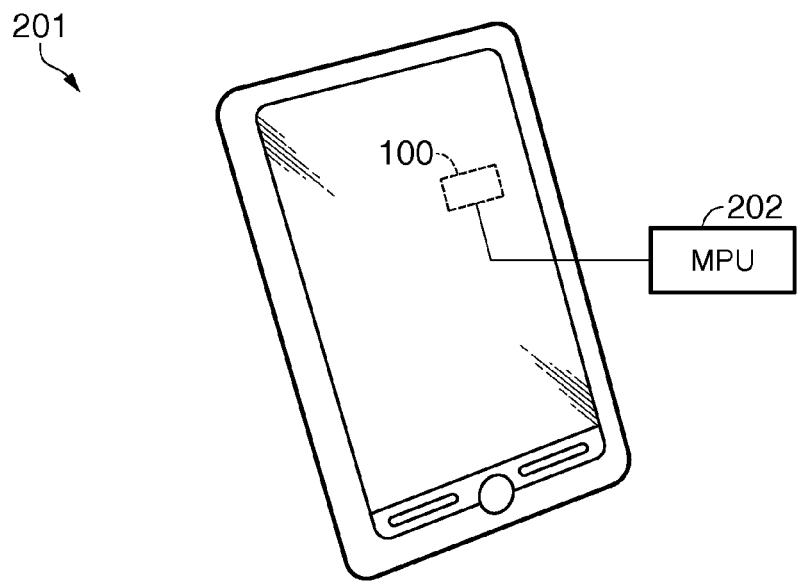
FIG. 11 is a perspective view schematically illustrating a smartphone as an electronic device.

FIG. 11 is a perspective view schematically illustrating a smartphone 201 as the electronic device. The angular velocity sensor 100 having the vibrator element 1 (or the vibrator element 2 or the vibrator element 3) is assembled into the smartphone 201. The angular velocity sensor 100 performs motion sensing to detect the attitude of the smartphone 201. The detection signal of the angular velocity sensor 100 is supplied to, for example, a microcomputer chip (MPU) 202. The MPU 202 may execute various processes according to the motion sensing. The motion sensing can be used by an electronic device such as a cell phone, a portable game machine, a game controller, a car navigation system, a pointing device, a head-mounted display, and a tablet PC.

Figure 12:
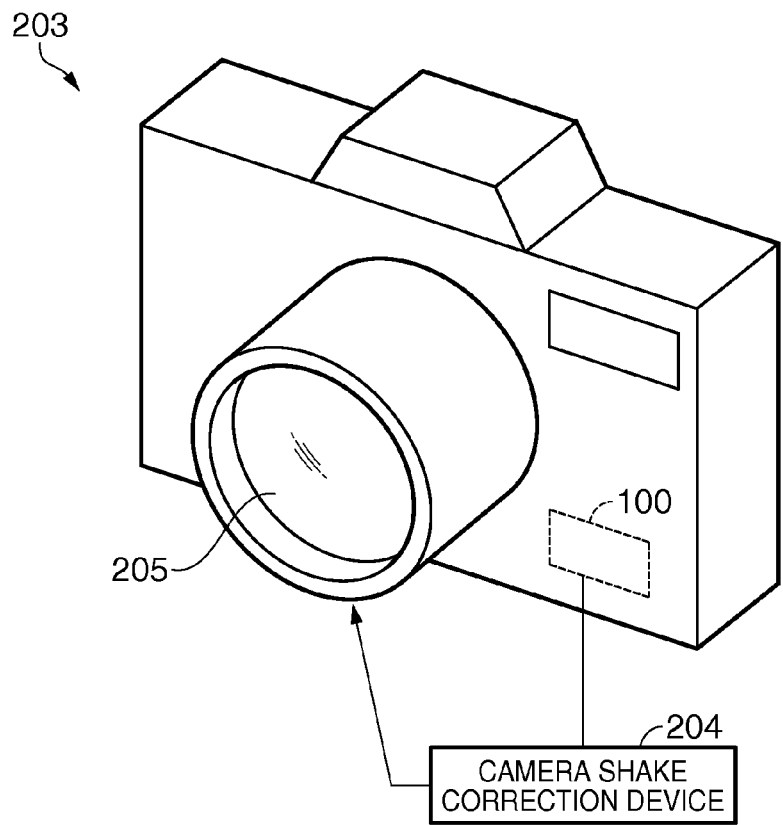
FIG. 12 is a perspective view schematically illustrating a digital camera as another specific example of the electronic device.

FIG. 12 is a perspective view schematically illustrating a digital camera (hereinafter, referred to as a "camera") 203 as another specific example of the electronic device. The angular velocity sensor 100 having the vibrator element 1 (or the vibrator element 2 or the vibrator element 3) is assembled into the camera 203. The angular velocity sensor 100 may detect the attitude of the camera 203. The detection signal of the angular velocity sensor 100 is supplied to a camera shake correction device 204. The camera shake correction device 204 may perform camera shake correction by, for example, moving a specific lens in a lens set 205 according to the detection signal of the angular velocity sensor 100. In addition, camera shake correction may also be used by a digital video camera.

Moving Body

Subsequently, a moving body including the angular velocity sensor 100 using any of the vibrator elements 1, 2, and 3 of Embodiments 1 to 3 described above will be described.

Figure 13:
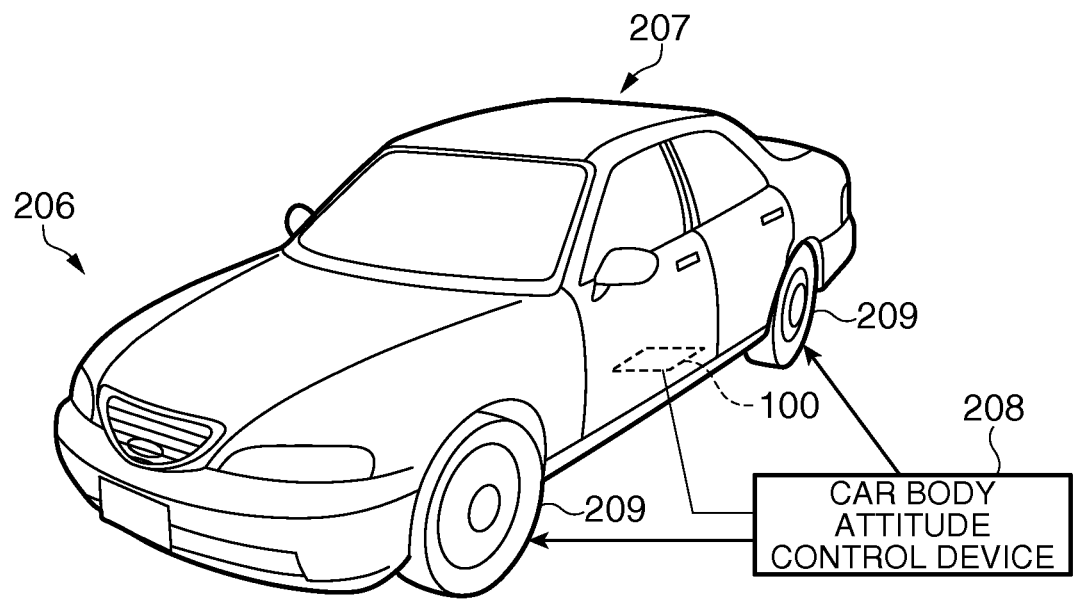
FIG. 13 is a perspective view schematically illustrating a car as a specific example of a moving body.

FIG. 13 is a perspective view schematically illustrating a car 206 as a specific example of the moving body. The angular velocity sensor 100 having the vibrator element 1 (or the vibrator element 2 or the vibrator element 3) is assembled into the car 206. The angular velocity sensor 100 may detect the attitude of a car body 207. The detection signal of the angular velocity sensor 100 is supplied to a car body attitude control device 208. For example, the car body attitude control device 208 may control hardness and softness of the suspension or control braking of individual wheels 209 according to the attitude of the car body 207. Such attitude control may be used by various moving bodies such as a biped walking robot, an aircraft, and a helicopter.

In each of the specific examples of the electronic device, since the vibrator element 1 (or the vibrator element 2 or the vibrator element 3) having high sensitivity is included in which adjustment for suppressing a leakage output is performed, the electronic device having high functional and stable characteristics can be provided.

For example, in the case of the smartphone 201, by performing motion sensing to detect attitudes, the attitude of the smartphone 201 can be accurately detected.

In addition, in the case of the digital camera 203, precise camera shake correction is enabled.

In addition, in the case of the car body attitude control device 208 of the car 206, there is an effect of accurately detecting the attitude of the car body 207.

The entire disclosure of Japanese Patent Application No. 2012-117255, filed May 23, 2012 is expressly incorporated by reference herein.

What is claimed is:

1. A vibrator element comprising:
a base portion;
a vibrating arm which extends from the base portion;
a drive section and a detecting section provided in the vibrating arm;
an adjusting arm which extends from the base portion along an extension direction of the vibrating arm; and
an adjusting section which is provided above a principal surface of the adjusting arm,
wherein the adjusting section has a first electrode, a second electrode, and a piezoelectric layer provided between the first and second electrodes, and
an output signal of the adjusting arm is in antiphase to a charge output from the detecting section when no angular velocity is added to the vibrating arm.

2. The vibrator element according to claim 1,
wherein, at a tip end portion of the detecting section on an opposite side to the base portion, a wide portion having a greater area than other parts of the detecting section is provided closer to a tip end side than the drive section.

3. The vibrator element according to claim 1,
wherein a length of the adjusting arm is shorter than a length of the vibrating arm.

4. The vibrator element according to claim 1,
wherein the adjusting section branches off in a width direction of the adjusting arm and extends in a lengthwise direction thereof.

5. The vibrator element according to claim 1,
wherein the adjusting section has a common portion which is provided along an extension direction of the adjusting arm, and a plurality of branching portions which branch off from the common portion toward both sides in the width direction and are arranged in the extension direction.

6. The vibrator element according to claim 5,
wherein a tip end side of the plurality of branching portions in the width direction has a greater width than a common portion side.

7. The vibrator element according to claim 1,
wherein, in the adjusting arm, a tip end portion is provided with a weight portion, and the adjusting section is provided above a base portion side.

8. An angular velocity sensor comprising:
the vibrator element according to claim 1;
an electronic component which includes a circuit that drives a drive vibrating arm and a circuit that detects a signal from the detecting section; and
a package which stores the vibrator element and the electronic component.

9. An electronic device comprising:
the vibrator element according to claim 1.

10. A moving body comprising:
the vibrator element according to claim 1.

* * * * *